United States Patent
Takagi et al.

(10) Patent No.: US 7,599,415 B2
(45) Date of Patent: Oct. 6, 2009

(54) LIGHT SOURCE DEVICE, LIGHTING DEVICE, MONITOR DEVICE, AND PROJECTOR

(75) Inventors: Kunihiko Takagi, Okaya (JP); Minehiro Imamura, Suwa (JP); Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 12/024,668

(22) Filed: Feb. 1, 2008

(65) Prior Publication Data

US 2008/0187014 A1 Aug. 7, 2008

(30) Foreign Application Priority Data

Feb. 6, 2007 (JP) ............................. 2007-026455

(51) Int. Cl.
*H01S 3/10* (2006.01)
*H01S 3/04* (2006.01)

(52) U.S. Cl. .......................... 372/34; 372/21; 372/22; 372/36

(58) Field of Classification Search ................. 372/21, 372/22, 34, 35, 36
See application file for complete search history.

(56) References Cited

U.S. PATENT DOCUMENTS

| | | | |
|---|---|---|---|
| 5,265,115 A | 11/1993 | Amano | |
| 6,072,815 A | 6/2000 | Peterson | |
| 6,240,113 B1 | 5/2001 | Peterson | |
| 6,383,144 B1 | 5/2002 | Mooney et al. | |
| 6,718,946 B2 | 4/2004 | Hokazono et al. | |
| 2002/0128568 A1 | 9/2002 | Mooney et al. | |
| 2008/0045855 A1 | 2/2008 | Mooney et al. | |

FOREIGN PATENT DOCUMENTS

| | | |
|---|---|---|
| JP | 05-198867 A | 8/1993 |
| JP | A 5-198870 | 8/1993 |
| JP | 07-302949 A | 11/1995 |
| JP | 2000-089006 A | 3/2000 |
| JP | 2001-085767 A | 3/2001 |
| JP | 2004-500909 A | 1/2004 |
| JP | 2004-084657 A | 3/2004 |
| JP | 2004-309046 A | 11/2004 |
| WO | WO-01/52728 A1 | 7/2001 |

*Primary Examiner*—Armando Rodriguez
(74) *Attorney, Agent, or Firm*—Oliff & Berridge, PLC (57) ABSTRACT

A light source device includes a light source section for supplying a laser beam, a wavelength conversion element for converting a wavelength of the laser beam from the light source section, a temperature measuring section for measuring temperature, a temperature adjusting section for adjusting the temperature of the wavelength conversion element in accordance with a result of the measurement by the temperature measuring section, and a thermal diffusion section for diffusing heat to be conducted to the wavelength conversion element, wherein the thermal diffusion section is provided with a first surface disposed on a side of the wavelength conversion element and a second surface disposed on an opposite side to the first surface, and the temperature measuring section is provided to a part of the thermal diffusion section, which is located on a side of the second surface and has higher thermal conductivity of the thermal diffusion section between the side of the first surface and the side of the second surface than the other part of the thermal diffusion section.

16 Claims, 8 Drawing Sheets

LIGHT SOURCE DEVICE, LIGHTING DEVICE, MONITOR DEVICE, AND PROJECTOR

This application claims priority from Japanese Patent Application No. 2007-026455 filed in the Japanese Patent Office on Feb. 6, 2007, the entire disclosure of which is hereby incorporated by reference in its entirety.

BACKGROUND

1. Technical Field

The present invention relates to a light source device, a lighting device, a monitor device, and a projector, and in particular to a technology of a light source device for supplying a laser beam.

2. Related Art

In recent years, as a light source device for a monitor device or a projector, a technology for using a laser source for supplying a laser beam has been proposed. In comparison with a UHP lamp, which has been used as a light source of a monitor or a projector in the past, the laser source device using a laser source has advantages such as high color reproducibility, instant-lighting capability, and long life. As the light source device using the laser source, besides the device for directly supplying the fundamental laser beam from the laser source, a device for converting the wavelength of the fundamental laser beam and then supplying the laser beam with the converted wavelength is known. As a wavelength conversion element for converting the wavelength of the fundamental laser beam, for example, a second harmonic generation/generating (SHG) element has been used. By using the wavelength conversion element, it becomes possible to supply a laser beam with a desired wavelength using an easily available multipurpose laser source. Further, a configuration capable of supplying a laser beam with sufficient intensity can also be provided. Regarding the SHG element, it is known that in the case in which the refractive index distribution is varied by the temperature variation, the phase matching condition is broken, and the efficiency of converting the wavelength is deteriorated. In order for supplying a laser beam with stable intensity with high efficiency, it is desirable to reduce the temperature variation of the wavelength conversion element. For example, in the technology proposed in JP-A-5-198870 (hereinafter referred to as a Document 1), the wavelength conversion element is attached to a substrate having thermal conductivity, and temperature control of the substrate is performed based on the temperature measured by a thermistor disposed in the substrate.

As a factor for varying the temperature of the wavelength conversion element, there can be cited a variation in the amount of absorption of the laser beam to the wavelength conversion element caused by a variation in the laser output, a variation in the ambient temperature of the light source device, and so on. In order for controlling the temperature of the wavelength conversion element with good accuracy even in the condition with such factors, it is desirable to detect the temperature close to the temperature of the wavelength conversion element itself. In this respect, in the configuration proposed in the Document 1 described above, the substrate with a volume several times as large as the wavelength conversion element is shown. Since such a big substrate has a large heat capacity, when a factor for causing the temperature of the wavelength conversion element to vary occurs, a large temperature difference should be caused between the wavelength conversion element and the substrate. Therefore, even if the thermistor disposed in such a substrate is used, there arises a problem that it is sometimes difficult to control the temperature of the wavelength conversion element with good accuracy.

SUMMARY

An advantage of some aspects of the invention is to provide a light source device capable of reducing the temperature variation of the wavelength conversion element by accurate temperature control, and thereby supplying a laser beam with stable intensity with high efficiency, a lighting device, a monitor device, and a projector each using the light source device.

According to an aspect of the invention, it is possible to provide a light source device including a light source section for supplying a laser beam, a wavelength conversion element for converting a wavelength of the laser beam from the light source section, a temperature measuring section for measuring temperature, a temperature adjusting section for adjusting the temperature of the wavelength conversion element in accordance with a result of the measurement by the temperature measuring section, and a thermal diffusion section for diffusing heat to be conducted to the wavelength conversion element, wherein the thermal diffusion section is provided with a first surface disposed on a side of the wavelength conversion element and a second surface disposed on an opposite side to the first surface, and the temperature measuring section is provided to a part of the thermal diffusion section, which is located on a side of the second surface and has higher thermal conductivity of the thermal diffusion section between the side of the first surface and the side of the second surface than the other part of the thermal diffusion section.

By disposing the temperature measuring section on the part of the second surface side of the thermal diffusion section, having high thermal conductivity, the temperature close to the temperature of the wavelength conversion element itself can be detected. It becomes possible to control the temperature of the wavelength conversion element with good accuracy even if a cause of varying the temperature of the wavelength conversion element occurs. Thus, the light source device capable of reducing the temperature variation of the wavelength conversion element by the accurate temperature control, thereby supplying the laser beam with stable intensity with high efficiency can be obtained.

Further, in another preferable aspect of the invention, it is desirable that the thermal diffusion section includes a connection section connected to the temperature measuring section. By connecting the temperature measuring section and the thermal diffusion section to each other using the connection section, the thermal conduction through the connection section becomes possible. By the thermal conduction using the connection section, accurate temperature control of the wavelength conversion element can be performed.

Further, in another preferable aspect of the invention, it is desirable that there is further provided an insulating layer disposed on a part of the second surface of the thermal diffusion section other than a part of the second surface, on which the connection section is disposed. Thus, unnecessary conduction between the wiring patterns respectively connected to the temperature measuring section and the temperature adjusting section can be blocked.

Further, in another preferable aspect of the invention, it is desirable that the thermal diffusion section is composed using a metallic material. Thus, the heat to be conducted to the wavelength conversion element can effectively be diffused.

Further, in another preferable aspect of the invention, it is desirable that the light source device further includes a support section provided with the thermal diffusion section and the insulating layer, and for supporting the wavelength conversion element, and a substrate on which the support section is disposed, the supporting section being disposed on the substrate using the part thereof to which the insulating layer is provided. By disposing the part of the support section, to which the insulating layer is provided, on the substrate, it becomes possible to reduce the heat conduction from the support section to the substrate. Thus, the temperature close to the temperature of the wavelength conversion element itself can be detected by the temperature measuring section. Further, by reducing the heat conduction from the support section to the substrate, the temperature control of the wavelength conversion element can efficiently be executed with a little amount of heat.

Further, in another preferable aspect of the invention, it is desirable that the light source device further includes a support section provided with the thermal diffusion section, and for supporting the wavelength conversion element, and a substrate on which the support section is disposed, the supporting section being disposed on the substrate using the part thereof other than the part to which the wavelength conversion element is provided. According to such a configuration, it becomes possible to make the temperature of the part of the support section, to which the wavelength conversion element is provided closer to the temperature of the wavelength conversion element. Thus, the temperature close to the temperature of the wavelength conversion element itself can be detected by the temperature measuring section. Further, the temperature of the wavelength conversion element can be equalized.

Further, in another preferable aspect of the invention, it is desirable that the light source device further includes a support section provided with the thermal diffusion section, and for supporting the wavelength conversion element, the connection section being disposed on the centerline passing through a substantial center location of the support section. By disposing the connection section on the centerline, it becomes possible to measure the temperature of the wavelength conversion element at a position the most distant from the abutting section of the support section with the substrate. Thus, the temperature of the wavelength conversion element can accurately be measured.

Further, in another preferable aspect of the invention, it is desirable that the thermal diffusion section includes a heat insulating section for reducing heat conduction between the connection section and a part of the thermal diffusion section surrounding the connection section. By providing the heat insulating section, the heat capacity of an area from the wavelength conversion element to the temperature measuring section can be reduced, thus the temperature difference between the wavelength conversion element and the temperature measuring section can also be reduced. Thus, the temperature of the wavelength conversion element can accurately be measured.

Further, in another preferable aspect of the invention, it is desirable that the thermal diffusion section includes a thinner section having a smaller distance between the first surface and the second surface, and the temperature measuring section is provided to the thinner section. By providing the temperature measuring section to the thinner section, the temperature close to the temperature of the wavelength conversion element itself can be detected. Thus, the accurate temperature control of the wavelength conversion element can be performed. Further, the strength necessary for supporting the wavelength conversion element can be ensured by a part of the thermal diffusion section other than the thinner section thereof.

Further, in another preferable aspect of the invention, it is desirable that the thermal diffusion section is composed of an insulating material. Thus, unnecessary conduction between the wiring patterns respectively connected to the temperature measuring section and the temperature adjusting section can be blocked.

Further, in another preferable aspect of the invention, it is desirable that the light source device further includes a support section provided with the thermal diffusion section, and for supporting the wavelength conversion element, a substrate on which the support section is disposed, and a heat insulating section for reducing heat conduction between the support section and the substrate. By reducing the heat conduction from the support section to the substrate, the temperature close to the temperature of the wavelength conversion element itself can be detected by the temperature measuring section. Further, by reducing the heat conduction from the support section to the substrate, the temperature control of the wavelength conversion element can efficiently be executed with a little amount of heat.

Further, in another preferable aspect of the invention, it is desirable that the light source device further includes a support section provided with the thermal diffusion section, and for supporting the wavelength conversion element, and a substrate on which the support section is disposed, the supporting section being disposed on the substrate using the part thereof other than the part to which the wavelength conversion element is provided. According to such a configuration, it becomes possible to make the temperature of the part of the support section, to which the wavelength conversion element is provided closer to the temperature of the wavelength conversion element. Thus, the temperature close to the temperature of the wavelength conversion element itself can be detected by the temperature measuring section. Further, the temperature of the wavelength conversion element can be equalized.

Further, in another preferable aspect of the invention, it is desirable that the light source device further includes a support section provided with the thermal diffusion section, and for supporting the wavelength conversion element, the thinner section being disposed on the centerline passing through a substantial center location of the support section. By disposing the thinner section on the centerline, it becomes possible to measure the temperature of the wavelength conversion element at a position distant from the abutting section of the support section with the substrate. Thus, the temperature of the wavelength conversion element can accurately be measured.

Further, according to another aspect of the invention, there is provided a lighting device including the light source device described above, wherein the lighting device lights an object using a light beam from the source device. By using the light source device described above, a laser beam with stable intensity can be supplied with high efficiency. Thus, the lighting device capable of supplying a laser beam with stable intensity with high efficiency.

Further, according to another aspect of the invention, there is provided a monitor device including the lighting device described above, and an imaging section for imaging a subject lighted by the lighting device. By using the lighting device described above, a laser beam with stable intensity can be supplied with high efficiency. Thus, the monitor device capable of monitoring a bright image can be obtained.

Further, according to another aspect of the invention, there is provided a projector including the lighting device described above, and a spatial light modulation device for modulating a light beam from the lighting device in accordance with an image signal. By using the lighting device described above, a laser beam with stable intensity can be supplied with high efficiency. Thus, the projector capable of stably displaying a bright image with high efficiency can be obtained.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Hereinafter, embodiments of the invention will be described in detail with reference to the accompanying drawings.

First Embodiment

Figure 1:
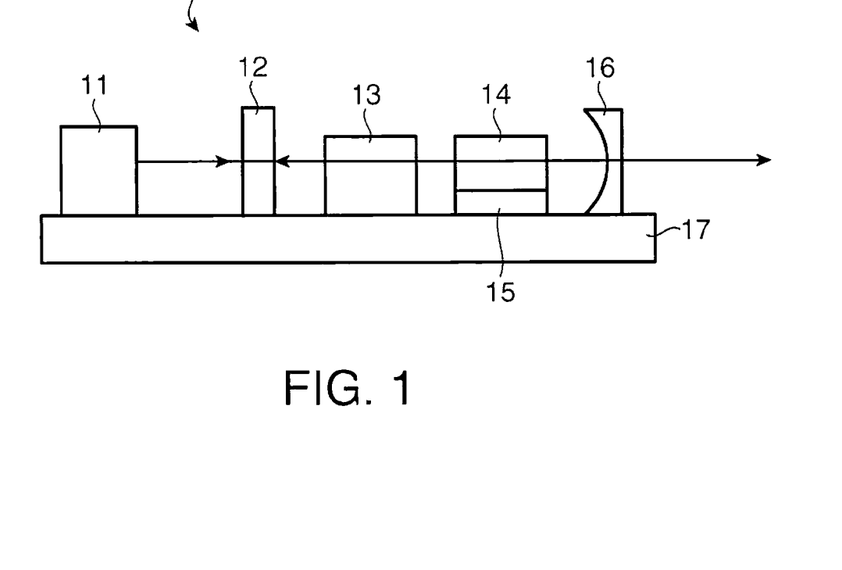
FIG. 1 is a diagram showing a schematic configuration of a light source device according to a first embodiment of the invention.

FIG. 1 is a diagram for schematically representing a rough configuration of a light source device 10 according to a first embodiment of the invention. The light source device 10 is a diode-pumped solid-state (DPSS) laser oscillator. The light source device 10 has a resonator structure using a first resonator mirror 12 and a second resonator mirror 16. A pump laser 11 is a semiconductor laser for supplying a laser beam with a wavelength of, for example, 808 nm, and an edge-emitting laser. The laser beam from the pump laser 11 enters a laser crystal 13 after passing through the first resonance mirror 12. As the laser crystal 13, a Nd:YVO$_4$ crystal or a Nd:YAG (Y$_3$Al$_5$O$_{12}$) crystal, for example, can be used. The laser crystal 13 performs laser oscillation when pumped, and supplies a laser beam with a wavelength of, for example, 1064 nm. The pump laser 11 and the laser crystal 13 form a light source section for supplying a laser beam.

The SHG element 14 is a wavelength conversion element for converting the wavelength of the laser beam from the laser crystal 13. The SHG element 14 converts the laser beam from the laser crystal 13 into a laser beam with a half wavelength thereof, and emits the converted laser beam. As the SHG element 14, nonlinear optical crystal can be used, for example. As the nonlinear optical crystal, for example, periodically poled lithium niobate (PPLN), which is a periodically poled crystal of lithium niobate (LiNbO$_3$), can be used. A support section 15 supports the SHG element 14. The second resonator mirror 16 is disposed on an opposite side to the laser crystal 13 with respect to the SHG element 14.

The SHG element 14 converts a laser beam of, for example, 1064 nm into a laser beam of 532 nm. The second resonator mirror 16 has a function of selectively reflecting a laser beam with a predetermined wavelength, for example, 1064 nm and transmitting laser beams with other wavelengths. The laser beam converted by the SHG element to have a wavelength of, for example, 532 nm passes through the second resonator mirror 16 and is emitted from the light source device 10. The laser beam with a wavelength other than the desired wavelength is reflected by the second resonator mirror 16. Similarly to the second resonator mirror 16, the first resonator mirror 12 selectively reflects the laser beam with a predetermined wavelength, for example, 1064 nm, and transmits light beams with other wavelengths. According to the resonator structure, the laser beam with a desired wavelength can efficiently be emitted. The pump laser 11, the first resonator mirror 12, the laser crystal 13, the support section 15, and the second resonator mirror 16 are disposed on a substrate 17.

The pump laser 11 is not limited to the edge-emitting laser, but can be a surface emitting laser. The light source device 10 is not limited to the DPSS laser oscillator. It can be a light source device in which a laser beam from a semiconductor laser as a light source section is input to the wavelength conversion element. In this case, as the light source section, besides the semiconductor laser, a solid-state laser, a liquid laser, a gas laser, and so on can also be used.

Figure 2:
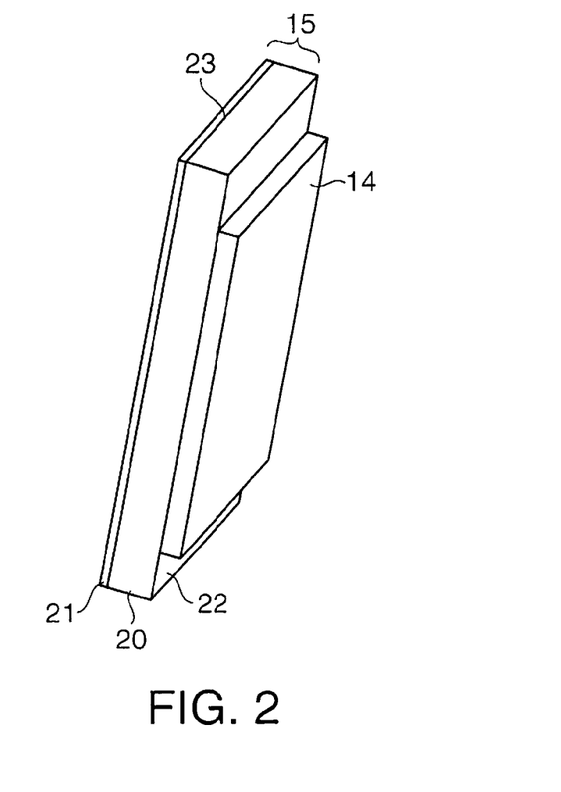
FIG. 2 is a diagram showing a perspective configuration of an SHG element and a support section.

FIG. 2 shows a perspective configuration of the SHG element 14 and the support section 15. The support section 15 has a thermal diffusion section 20 and an insulating layer 21. The thermal diffusion section 20 diffuses heat to be conducted to the SHG element 14. The thermal diffusion section 20 is composed using a material with high thermal conductivity such as copper as a metallic material. The thermal diffusion section 20 has a rectangular planar shape. The thermal diffusion section 20 is formed to have a thickness in a range of about 40 μm through 1 mm, for example. The SHG element 14 is disposed on a first surface 22 of the thermal diffusion section 20. The SHG element 14 is disposed so that the center location of the SHG element 14 and the center location of the thermal diffusion section 20 are conformed to each other.

The SHG element 14 has an oblong planar shape, which is shorter than the thermal diffusion section 20 in the longitudinal direction of the thermal diffusion section 20. The first surface 22 of the thermal diffusion section 20 and the SHG element 14 are bonded with each other using, for example, a thermally conductive adhesive. The insulating layer 21 is disposed on a second surface 23 of the thermal diffusion section 20. The second surface 23 is one of the surfaces of the thermal diffusion section 20, and disposed on the side opposite to the side of the first surface 22. The insulating layer 21 is composed using a material with an insulating property such as epoxy resin. The insulating layer 21 is formed to have a thickness in a range of about 10 through 200 μm, for example.

Figure 3:
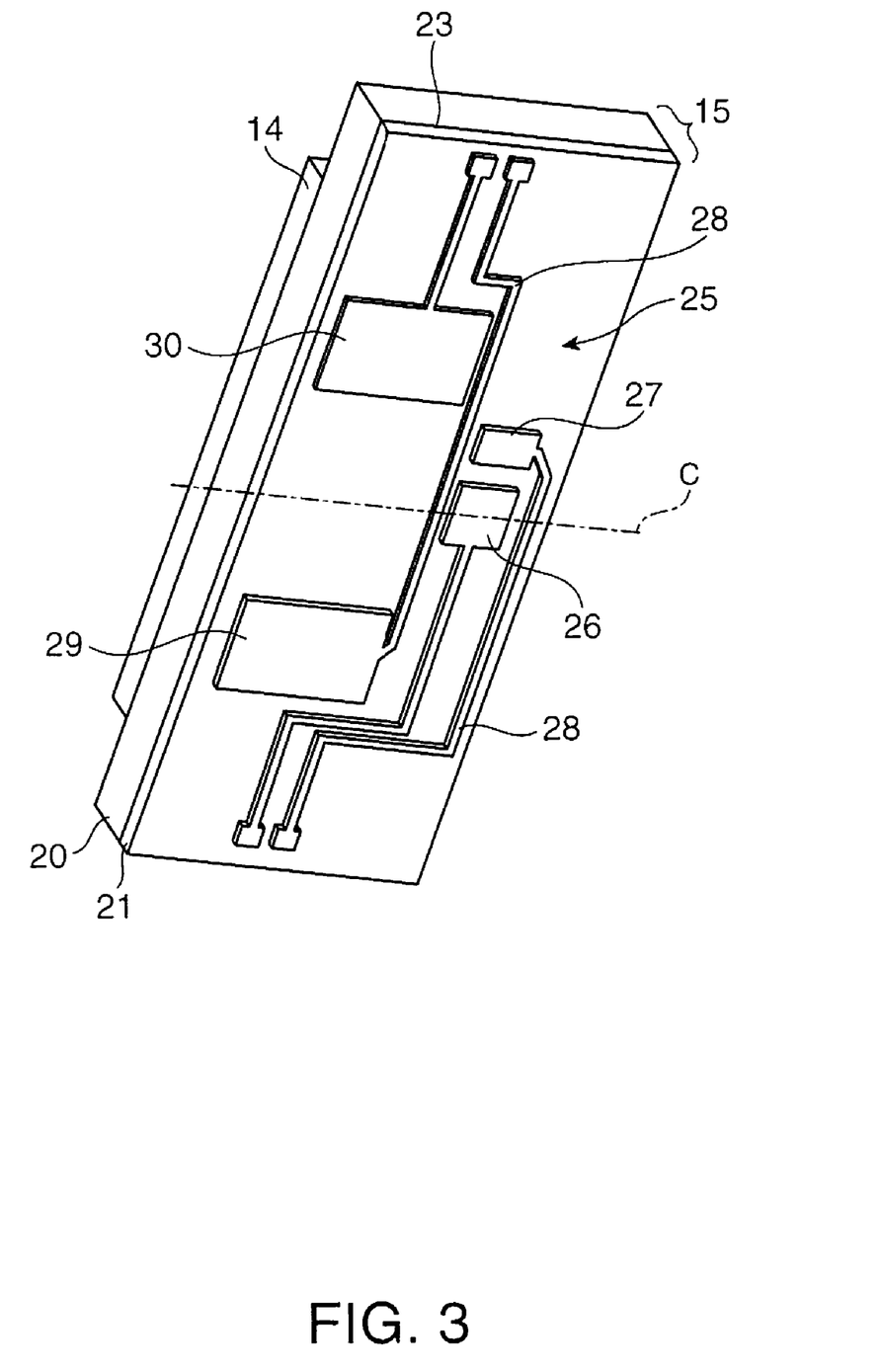
FIG. 3 is a diagram showing a perspective configuration, the configuration shown in FIG. 2 viewed from a side of an insulating layer.

FIG. 3 shows a perspective configuration, namely the configuration shown in FIG. 2 viewed from a side of an insulating layer 21. On the insulating layer 21, there is formed a wiring pattern 25. The wiring pattern 25 is composed using an electrically conductive material such as a copper foil as a metallic material. The wiring pattern 25 includes a first thermistor land 26 and a second thermistor land 27 to which a thermistor described later is connected. The wiring pattern 25 includes a first heater land 29 and a second heater land 30 to which a heater described later is connected. Conductive wire sections 28 each supply the thermistor or the heater with an electrical current. The centerline C of the support section 15 is a line passing through the center location of the support section 15 and dividing the support section 15 into two equal parts with respect to the longitudinal direction of the support section 15. The first thermistor land 26 is disposed on the centerline C.

Figure 4:
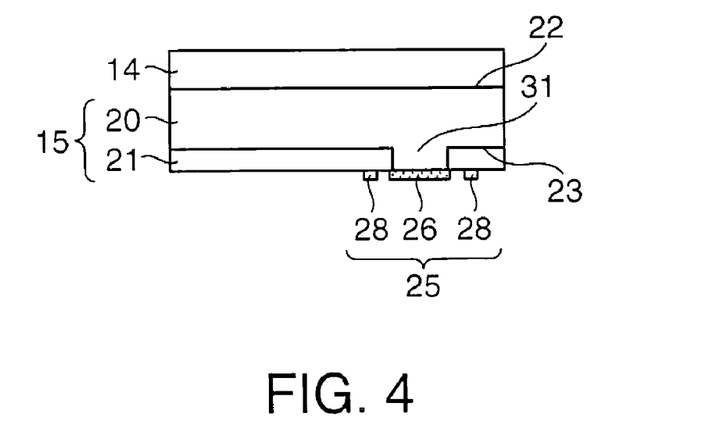
FIG. 4 is a diagram showing a cross-sectional configuration of the SHG element, the support section, and a wiring pattern along the centerline.

FIG. 4 shows a cross-sectional configuration of the SHG element 14, the support section 15, and the wiring pattern 25 along the centerline C shown in FIG. 3. The thermal diffusion section 20 has a connection section 31 formed on the side of the second surface 23. The connection section 31 is formed at a position corresponding to the first thermistor land 26, namely on the centerline C. The connection section 31 is connected to the thermistor described later via the first thermistor land 26. The connection section 31 is composed using a material with high thermal conductivity such as copper as a metallic material.

The insulating layer 21 is provided to a part of the second surface 23 of the thermal diffusion section 20 other than a part thereof provided with the connection section 31. The connection section 31 is formed using copper with high thermal conductivity compared to a resin material forming the insulating layer 21. Therefore, the connection section 31 out of the thermal diffusion section 20 is a section having high thermal conductivity between the side of the first surface 22 and the side of the second surface 23 compared to the part provided with the insulating layer 21, which is the other part of the thermal diffusion section 20.

The connection section 31 abuts only on the first thermistor land 26 out of the wiring pattern 25. The second thermistor land 27, the first heater land 29, the second heater land 30 (see FIG. 3), and the conductive wire sections 28 out of the wiring pattern 25 are all disposed on the thermal diffusion section 20 via the insulating layer 21 intervening therebetween. By providing the insulating layer 21, unnecessary connection among the lands 26, 27, 29, and 30 or between the conductive wire sections 28 via the thermal diffusion section 20 can be blocked.

The connection section 31 can be formed by, for example, etching the other part of a plate like copper member than the connection section 31. The insulating layer 21 can be formed by applying an insulating material on the part of the second surface 23 of the thermal diffusion section 20 other than the connection section 31. The wiring pattern 25 can be formed by executing plating on the insulating layer 21 and the connection section 31 to form a copper foil, and then executing patterning and etching on the copper foil.

Figure 5:
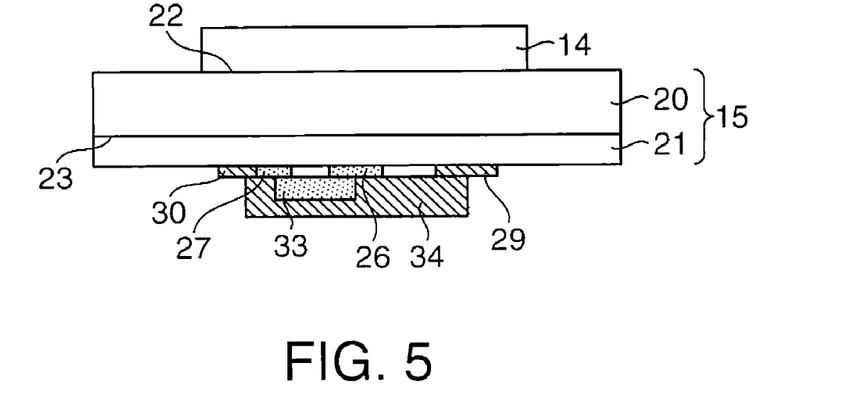
FIG. 5 is a diagram for explaining an arrangement of a thermistor and a heater.

FIG. 5 is a diagram for explaining an arrangement of the thermistor 33 and the heater 34. The thermistor 33 is fixed to the first and second thermistor lands 26, 27 by, for example, soldering. The thermistor 33 is a temperature measuring section for measuring the temperature. The heater 34 is fixed to the first and second heater lands 29, 30 by, for example, soldering. The heater 34 is a temperature adjusting section for adjusting the temperature of the SHG element 14 by supplying heat based on the result of the measurement by the thermistor 33. In FIG. 5, the thermistor 33 is disposed on the near side of the heater 34 in the sheet of the drawing. The first and second thermistor lands 26, 27 are disposed on the near side of the first and second heater lands 29, 30 in the sheet of the drawing.

Figure 6:
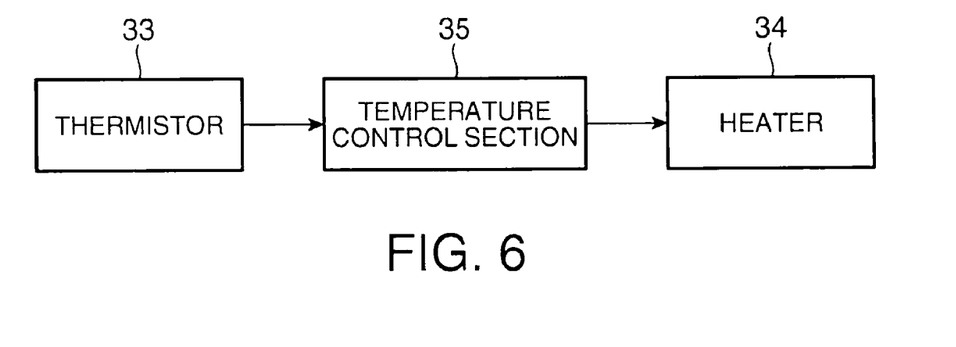
FIG. 6 is a diagram showing a block configuration for controlling the temperature of the SHG element.

FIG. 6 shows a block configuration for controlling the temperature of the SHG element 14 based on the result of the measurement by the thermistor 33. The thermistor 33 outputs a variation in the temperature to the temperature control section 35 in the form of a variation in resistance. The temperature control section 35 calculates an amount of electric power to be supplied to the heater 34 based on a temperature difference between the temperature measured by the thermistor 33 and the set temperature of the SHG element 14, and supplies the heater 34 with the electric power corresponding to the calculated amount of electric power. The temperature control section 35 performs feedback control of the heater 34 based on the result of the measurement by the thermistor 33. The heater 34 adjusts the temperature of the SHG element 14 based on the result of the measurement by the thermistor 33.

By connecting the thermistor 33 and the thermal diffusion section 20 to each other using the connection section 31 (see FIG. 4), the thermal conduction through the connection section 31 becomes possible. By the thermal conduction using the connection section 31 which is a part of the thermal diffusion section 20 having higher thermal conductivity compared to the other part of the thermal diffusion section 20, the temperature closer to the temperature of the SHG element 14 itself can be detected. Further, by using the thermal diffusion section 20 with a small volume, the heat capacity of the thermal diffusion section 20 can be reduced.

Figure 7:
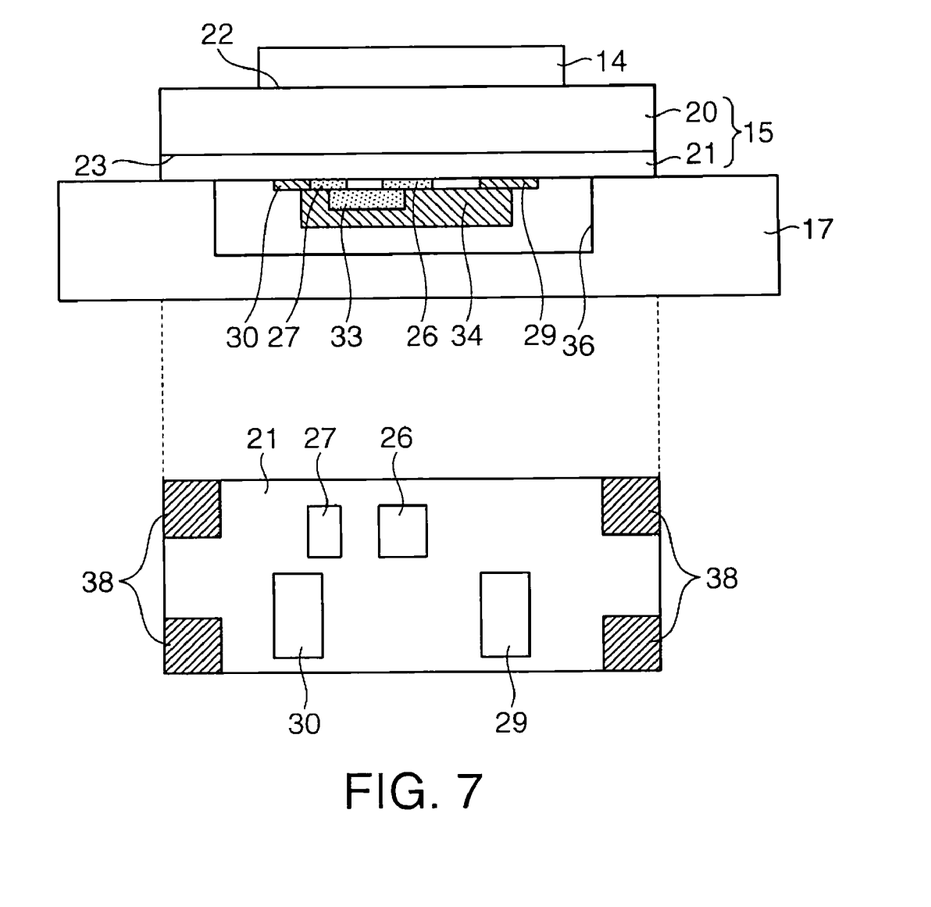
FIG. 7 is a diagram for explaining a condition in which the configuration shown in FIG. 5 and the substrate are combined.

FIG. 7 is a diagram for explaining a condition in which the configuration shown in FIG. 5 and the substrate 17 are combined. The thermistor 33 and the heater 34 are disposed inside a recess section 36 of the substrate 17. The support section 15 is disposed on the substrate 17 so that abutting areas 38 of the insulating layer 21 abut on the substrate 17. The abutting areas 38 are areas corresponding to the four corners of the insulating layer 21 having a rectangular shape. The support section 15 is disposed on the substrate 17 using a part provided with the insulating layer 21. The recess section 36 is provided to an area corresponding to the support section 15 and other than the parts to abut on the abutting areas 38.

By disposing the abutting areas 38 provided to the part of the support section 15 provided with the insulating layer 21 on the substrate 17, it becomes possible to reduce the heat conduction from the support section 15 to the substrate 17. By reducing the heat conduction from the support section 15 to the substrate 17, the temperature control of the SHG element 14 can efficiently be executed with a little amount of heat. Further, by disposing the support section 15 with the abutting areas 38 each having a small area, the heat conduction from the support section 15 to the substrate 17 can be reduced. By using the four corners of the insulating layer 21 as the abutting areas 38, the heat conduction from the support section 15 to the substrate 17 can be reduced while fixing the support section 15 on the substrate 17. Further, the temperature of the SHG element 14 can be equalized.

The abutting areas 38 are each a part of the insulating layer 21, having contact with a part of the thermal diffusion section 20, on which the SHG element 14 is not mounted. The support section 15 is disposed on the substrate 17 using the abutting areas 38. Further, as described above, by adopting the configuration of connecting the thermistor 33 to the connection section 31 (see FIG. 4) on the centerline C (see FIG. 3), it becomes possible to measure the temperature of the SHG element 14 at a position in the support section 15, the most distant from the abutting areas 38.

According to the configuration described hereinabove, it becomes possible to approximate the temperature of the part of the support section 15, provided with the SHG element 14 to the temperature of the SHG element 14. Thus, the temperature close to the temperature of the SHG element 14 itself can be detected by the thermistor 33. Further, the temperature of the SHG element 14 can be equalized.

Regarding the SHG element 14, it is known that in the case in which the refractive index distribution is varied by the temperature variation, the phase matching condition is broken, and the efficiency of converting the wavelength is deteriorated. For example, in order for maintaining high wavelength conversion efficiency in PPLN, it is desirable that the range of the temperature variation is controlled within about one degree. Further, it has been confirmed that the laser beam from the pump laser 11 is an infrared beam, and that about $10^{-2}$ through $10^{-4}$ of the energy of the laser beam input to the SHG element 14 is absorbed by the SHG element 14. Such absorption of the energy can be a principal factor for varying the temperature of the SHG element 14. When the output of the laser beam from the pump laser 11 (see FIG. 1) is varied, the temperature of the SHG element 14 should easily be varied. Further, in accordance with the environment in which the light source device 10 is disposed, the temperature of the SHG element 14 should also be varied easily.

As described above, the light source device 10 according to the embodiment of the invention can detect the temperature close to the temperature of the SHG element 14 itself by the thermistor 33. It becomes possible to control the temperature of the SHG element 14 with good accuracy even if a cause of varying the temperature of the SHG element 14 occurs. Thus, the advantage that the temperature variation of the wavelength conversion element is reduced by the accurate temperature control, thereby supplying the laser beam with stable intensity with high efficiency can be obtained.

Figure 8:
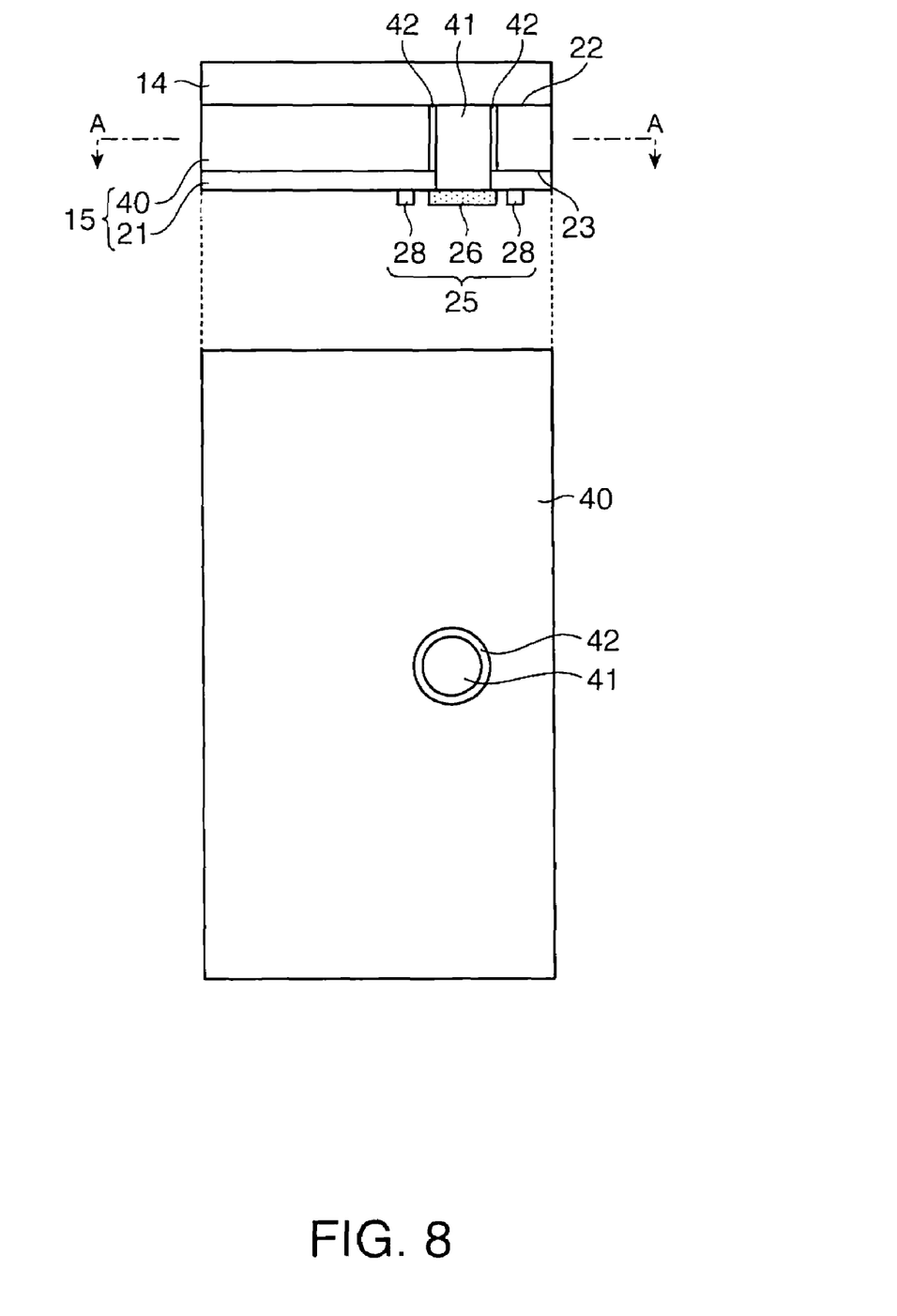
FIG. 8 is a diagram for explaining a modified example 1 of the first embodiment.

FIG. 8 is a diagram for explaining a modified example 1 of the present embodiment, and shows a cross-sectional configuration of the SHG element 14, the support section 15, and the wiring pattern 25, and a cross-sectional view of a thermal diffusion section 40 along the A-A line in the configuration. The present modified example is characterized in providing a heat insulating section 42 to the thermal diffusion section 40. The thermal diffusion section 40 has a connection section 41 penetrating from the side of the first surface 22 to the side of the second surface 23. The connection section 41 has, for example, a cylindrical shape. The heat insulating section 42 is formed in the thermal diffusion section 40 on the periphery of the connection section 41. Similarly to the connection section 41, the heat insulating section 42 is provided so as to penetrate from the side of the first surface 22 to the side of the second surface 23.

The heat insulating section 42 reduces the heat conduction between the connection section 41 and a part of the thermal diffusion section 40 surrounding the connection section 41. The heat insulating section 42 is composed using a heat insulating material such as epoxy resin. By providing the heat insulating section 42, the heat capacity from the SHG element 14 to the thermistor not shown can be reduced, thus the temperature difference between the SHG element 14 and the thermistor can also be reduced. Thus, the temperature of the SHG element 14 can accurately be measured. The heat insulating section 42 can be composed using other resin than the epoxy resin. Further, it is possible to use a layer of air formed by providing a gap around the periphery of the connection section 41 as the heat insulating section 42.

Figure 9:
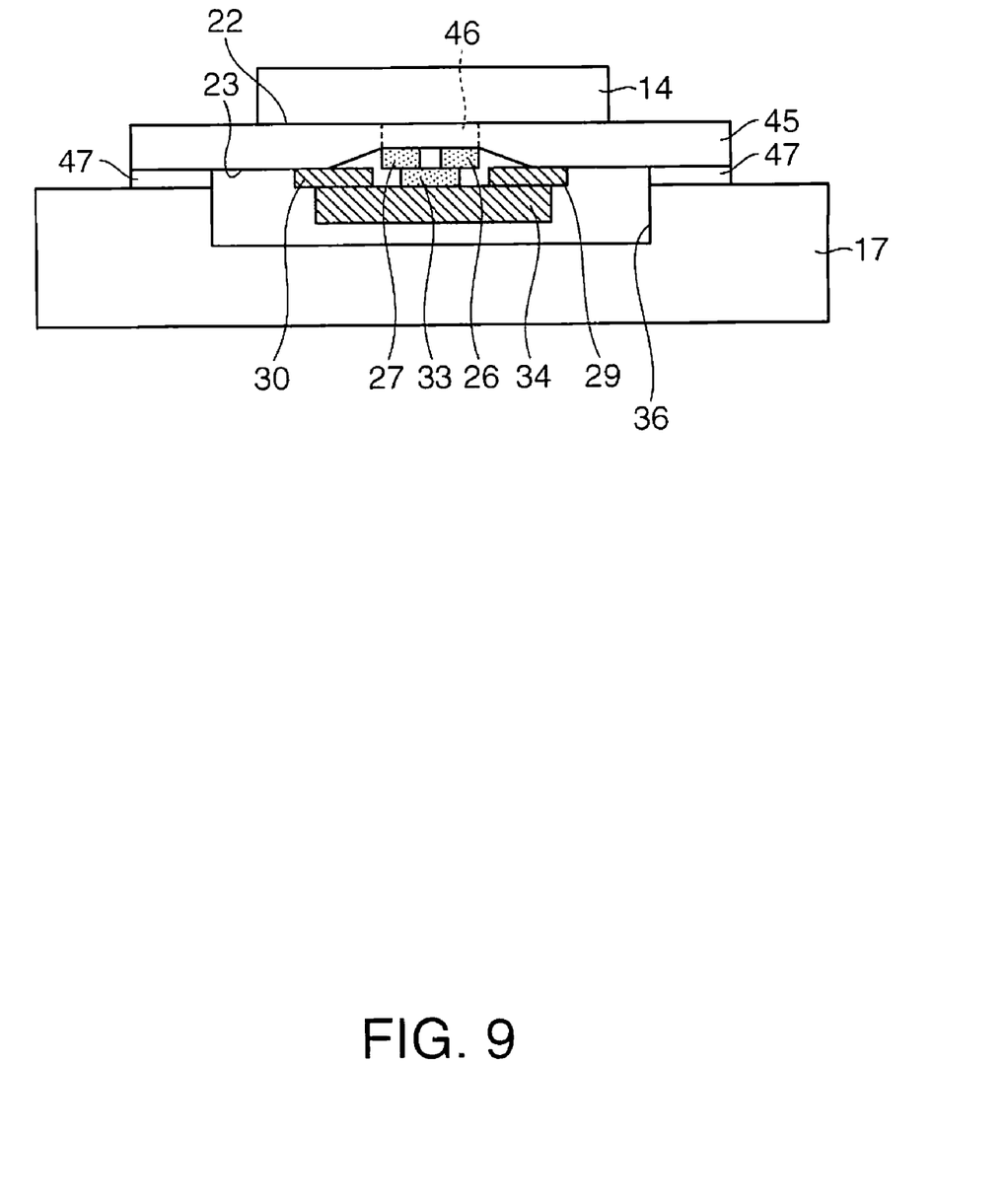
FIG. 9 is a diagram for explaining a modified example 2 of the first embodiment.

FIG. 9 is a diagram for explaining a modified example 2 of the present embodiment. The present modified example is characterized in including a thermal diffusion section 45 having a thinner section 46. The thermal diffusion section 45 is a support section for supporting the SHG element 14. The thermal diffusion section 45 is composed using a material having an insulating property in addition to high thermal conductivity such as aluminum nitride as a ceramic material. By composing the thermal diffusion section 45 using the insulating material, unnecessary conduction between the lands or the conductive wire sections can be blocked.

The thinner section 46 is a part of the thermal diffusion section 45 provided with a smaller distance between the first surface 22 and the second surface 23. The thinner section 46 is formed by providing the thermal diffusion section 45 with a recess on the side of the second surface 23. The thinner section 46 is formed at substantially the central portion of the second surface 23. The thinner section 46 is a part of the thermal diffusion section 45, having higher thermal conductivity between the side of the first surface 22 and the side of the second surface 23 compared to the other part thereof.

The wiring pattern 25 (see FIG. 3) is formed on the second surface 23 of the thermal diffusion section 45. The first and second thermistor lands 26, 27 are provided to the thinner section 46 in the second surface 23 of the thermal diffusion section 45. The thermistor 33 is also provided to the thinner section 46. In FIG. 9, the thermistor 33 is disposed on the near side of the first and second heater lands 29, 30 in the sheet of the drawing. By providing the thermistor 33 to the thinner section 46, the temperature close to the temperature of the SHG element 14 itself can be detected. Further, the strength necessary for supporting the SHG element 14 can be assured by the other part of the thermal diffusion section 45 than the thinner section 46. Further, by using the thermal diffusion section 45 with a small volume, the heat capacity of the thermal diffusion section 45 can be reduced.

A heat insulating section 47 is disposed between the thermal diffusion section 45 and the substrate 17. The heat insulating section 47 reduces the heat conduction between the thermal diffusion section 45 and the substrate 17. The heat insulating section 47 can be disposed at the same areas as the abutting areas 38 (see FIG. 7) described above. By providing the heat insulating section 47, the heat conduction from the thermal diffusion section 45 to the substrate 17 can be reduced. By reducing the heat conduction from the thermal diffusion section 45 to the substrate 17, the temperature control of the SHG element 14 can efficiently be executed with a little amount of heat.

The heat insulating section 47 is provided to a part of the second surface 23 of the thermal diffusion section 45 other than a part thereof corresponding to the SHG element 14. The thermal diffusion section 45 is disposed on the substrate 17 using the other part than the part provided with the SHG element 14. Further, it becomes possible for the thermistor 33 provided to substantially the central section of the thermal diffusion section 45 to measure the temperature of the SHG element 14 at a position the most distant from the part of the thermal diffusion section 45, abutting on the substrate 17 via the heat insulating section 47.

According to the configuration described above, it becomes possible to make the temperature of the thinner section 46 of the thermal diffusion section 45 to be closer to the temperature of the SHG element 14. Therefore, the temperature of the SHG element 14 can be control with good accuracy, thus the accurate temperature control of the SHG element 14 can be performed. A material for composing the thermal diffusion section 45 is only required to have high thermal conductivity and an insulating property, and other ceramic materials than the aluminum nitride, such as alumina can also be used.

The light source device 10 is not limited to have the configuration of using the heater 34 as the temperature adjusting section. As the temperature adjusting section, for example, a peltiert element can also be used. In the case of using the peltiert element, the temperature of the SHG element 14 can be adjusted not only by supplying heat but also by absorbing heat. The light source device 10 is not limited to the DPSS laser oscillator. It can be a light source device in which a laser beam from a semiconductor laser as a light source section is input to the wavelength conversion element. In this case, the light source device 10 can adopt an external resonator structure using the mirror provided to the semiconductor laser as the first resonator mirror. Further, as the light source section, besides the semiconductor laser, a solid-state laser, a liquid laser, a gas laser, and so on can also be used.

Second Embodiment

Figure 10:
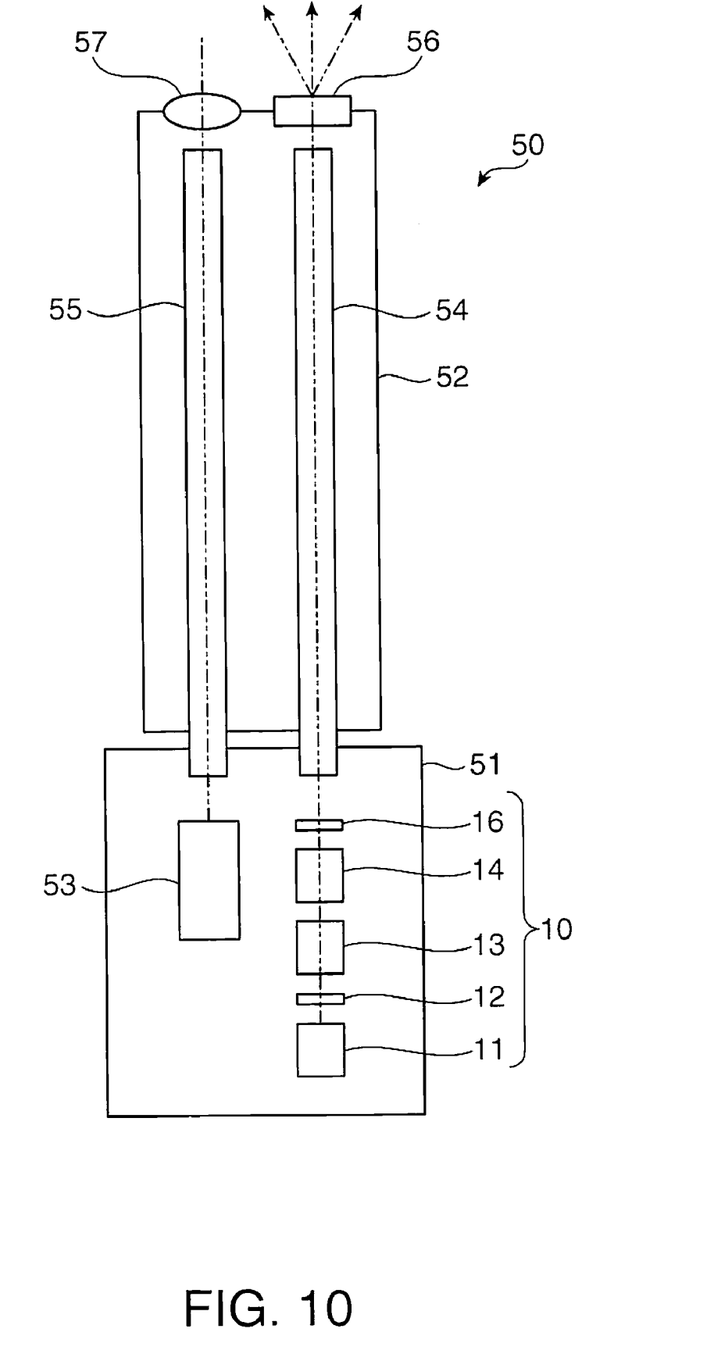
FIG. 10 is a diagram showing a schematic configuration of a monitor device according to a second embodiment of the invention.

FIG. 10 shows a schematic configuration of a monitor device 50 according to a second embodiment of the invention. The monitor device 50 has a device main body 51 and an optical transmission section 52. The device main body 51 is provided with the light source device 10 according to the first embodiment described above. The same parts as in the first embodiment are denoted with the same reference numerals, and the duplicated explanations will be omitted.

The optical transmission section 52 has two light guides 54, 55. A diffusing plate 56 and an imaging lens 57 are disposed at an end of the optical transmission section 52 on the side of the subject (not shown). A first light guide 54 transmits a light beam from the light source device 10 to the subject. The diffusing plate 56 is provided on an emission side of the first light guide 54. The light beam propagated inside the first light guide 54 passes through the diffusing plate 56 to be diffused on the side of the subject. The sections in the light path from the light source device 10 to the diffusing plate 56 form a lighting device for lighting the subject.

The second light guide 55 transmits the light beam from the subject to a camera 53. The imaging lens 57 is disposed on an entrance side of the second light guide 55. The imaging lens 57 focuses the light beam from the subject on an entrance surface of the second light guide 55. The light beam from the subject is input to the second light guide 55 by the imaging lens 57, and then propagated inside the second light guide 55 to enter the camera 53.

As each of the first and second light guides 54, 55, a bundle of a number of optical fibers can be used. By using the optical fibers, the laser beam can be transmitted to a distance. The camera 53 is provided inside the device main body 51. The camera 53 is an imaging section for imaging the subject lighted by the sections in the light path from the light source device 10 to the diffusing plate 56. By inputting the light beam input from the second light guide 55 to the camera 53, imaging of the subject can be executed by the camera 53. By adopting the lighting device equipped with the light source device 10 according to the first embodiment described above, the laser beam with stable intensity can be supplied with high efficiency. Thus, the advantage that a bright image can be monitored is obtained.

Third Embodiment

Figure 11:
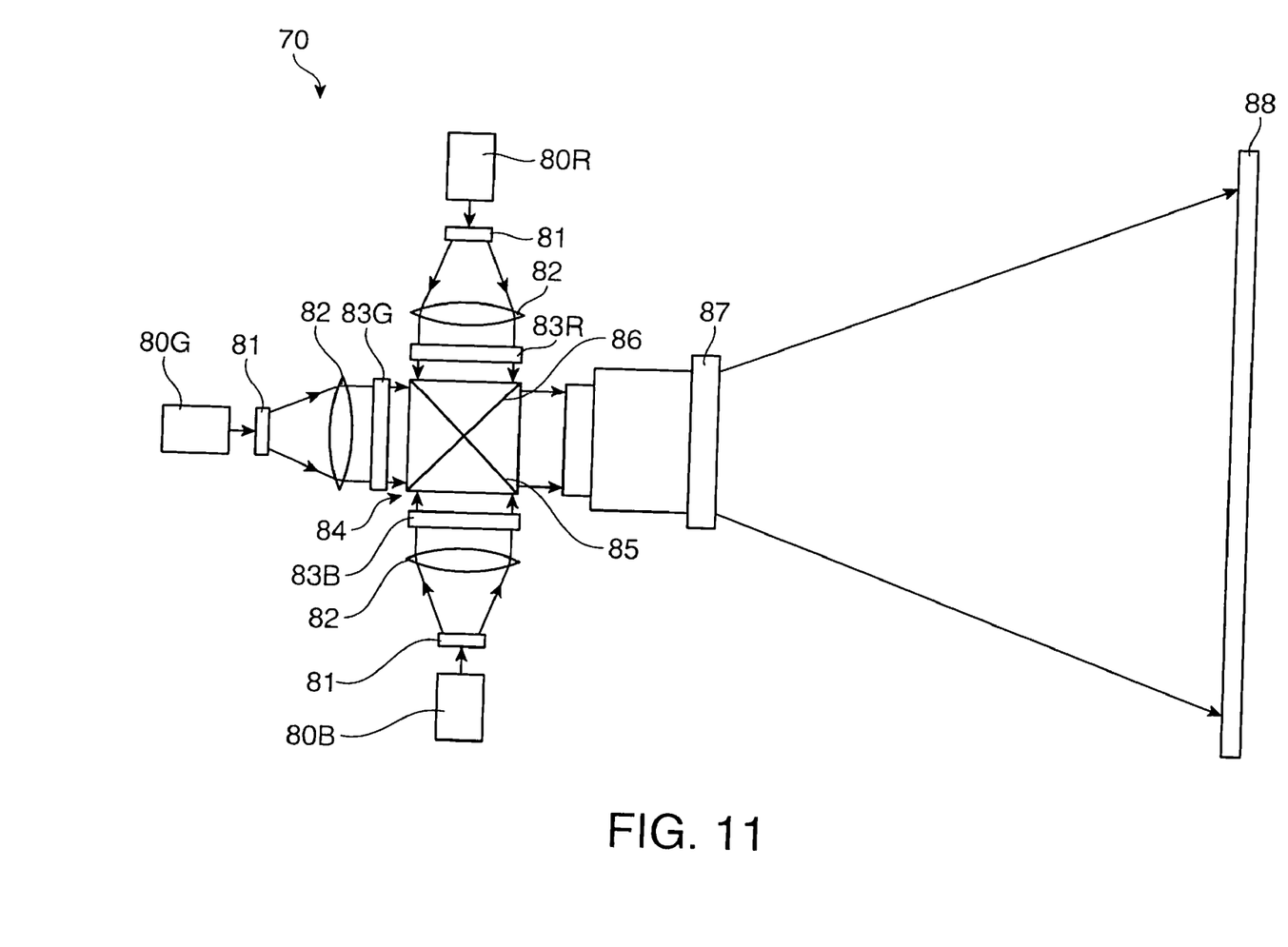
FIG. 11 is a diagram showing a schematic configuration of a projector according to a third embodiment of the invention.

FIG. 11 shows a schematic configuration of a projector 70 according to a third embodiment of the invention. The projector 70 is a front projection projector, which supplies the screen 88 with light for allowing the viewer to appreciate an image by viewing the light reflected on the screen 88. The projector 70 has a red (R) light source device 80R, a green (G) light source device 80G, and a blue (B) light source device 80B. The light source devices 80R, 80G, and 80B for respective colored light beams are each provided with the same configuration as the light source device 10 (see FIG. 1) of the first embodiment described above. Duplicate explanations of the first embodiment will be omitted. The projector 70 displays an image using light beams from the respective colored light sources 80R, 80G, and 80B.

The R-light source device 80R is a light source device for supplying the R-light beam. A diffusing element 81 performs fairing and enlarging the irradiated area, and equalizing the intensity distribution of the laser beam in the irradiated area. As the diffusing element 81, for example, a computer generated hologram (CGH), which is a diffractive optical element, can be used. The field lens 82 parallelizes the laser beam from the diffusing element 81, and make the laser beam enter the R-light spatial light modulation device 83R. The R-light source device 80R, the diffusing element 81, and a field lens 82 form a lighting device for lighting the R-light spatial light modulation device 83R. The R-light spatial light modulation device 83R is a spatial light modulation device for modulating the R-light beam from the lighting device in accordance with an image signal, and is a transmissive liquid crystal display device. The R-light beam modulated by the R-light spatial light modulation device 83R enters a cross dichroic prism 84 as a color composition optical system.

The G-light source device 80G is a light source device for supplying the G-light beam. The laser beam passing through the diffusing element 81 and the field lens 82 enters a G-light spatial light modulation device 83G. The G-light source device 80G, the diffusing element 81, and the field lens 82 form a lighting device for lighting the G-light spatial light modulation device 83G. The G-light spatial light modulation device 83G is a spatial light modulation device for modulating the G-light beam from the lighting device in accordance with the image signal, and is a transmissive liquid crystal display device. The G-light beam modulated by the G-light spatial light modulation device 83G enters the cross dichroic prism 84 from a different side from the R-light beam.

The B-light source device 80B is a light source device for supplying the B-light beam. The laser beam passing through the diffusing element 81 and the field lens 82 enters a B-light spatial light modulation device 83B. The B-light source device 80B, the diffusing element 81, and a field lens 82 form a lighting device for lighting the B-light spatial light modulation device 83B. The B-light spatial light modulation device 83B is a spatial light modulation device for modulating the B-light beam from the lighting device in accordance with the image signal, and is a transmissive liquid crystal display device. The B-light beam modulated by the B-light spatial light modulation device 83B enters the cross dichroic prism 84 from a different side from the R-light beam and the G-light beam. As the transmissive liquid crystal display device, for example, a high temperature polysilicon TFT liquid crystal panel (HTPS) can be used.

The cross dichroic prism 84 is provided with two dichroic films 85, 86 disposed so as to be substantially perpendicular to each other. The first dichroic film 85 reflects the R-light beam and transmits the G-light beam and the B-light beam. The second dichroic film 86 reflects the B-light beam and transmits the R-light beam and the G-light beam. The cross dichroic prism 84 combines the R, G, and B-light beams entering in directions different from each other to emit the combined light in the direction towards the projection lens 87. The projection lens 87 projects the light combined by the cross dichroic prism 84 towards the screen 88.

By using the light source devices 80R, 80G, and 80B for respective colored light beams each having a similar configuration to the light source device 10 described above, laser beams with stable intensity can be supplied with high efficiency. Thus, an advantage that a bright image can stably be displayed with high efficiency is obtained. The projector 70 is not limited to the case of using the transmissive liquid crystal display devices as the spatial light modulation devices. As the spatial light modulation device, a reflective liquid crystal display device (liquid crystal on silicon; LCOS), a digital micromirror device (DMD), a grating light valve (GLV), and so on can also be used.

The projector 70 is not limited to having a configuration provided with the spatial light modulation device for every colored light beam. The projector 70 can be arranged to have a configuration of modulating two or more colored light beams by a single spatial light modulation device. The projector can be a so-called rear projector, which supplies one of the surfaces of the screen with light and allows the viewer to appreciate an image by viewing the light emitted from the other surface of the screen. Further, the application of the light source device according to the embodiment of the invention is not limited to the projector or the monitor device. For example, it can also be applied, for example, to a lithography for performing exposure using a laser beam.

As described above, the light source device according to the embodiment of the invention is suitable for applying to monitor devices or projectors.

What is claimed is:

1. A light source device comprising:
   a light source section that supplies a laser beam;
   a wavelength conversion element that converts a wavelength of the laser beam from the light source section;
   a temperature measuring section that measures temperature;
   a temperature adjusting section that adjusts the temperature of the wavelength conversion element in accordance with a result of the measurement by the temperature measuring section; and
   a thermal diffusion section that diffuses heat to be conducted to the wavelength conversion element,
   wherein the thermal diffusion section is provided with a first surface disposed on a side of the wavelength conversion element and a second surface disposed on an opposite side to the first surface, and
   the temperature measuring section is provided to a part of the thermal diffusion section, which is located on a side of the second surface and has higher thermal conductivity of the thermal diffusion section between the side of the first surface and the side of the second surface than the other part of the thermal diffusion section.

2. The light source device according to claim 1, wherein the thermal diffusion section includes a connection section connected to the temperature measuring section.

3. The light source device according to claim 2, further comprising:
   an insulating layer disposed on a part of the second surface of the thermal diffusion section other than a part of the second surface, on which the connection section is disposed.

4. The light source device according to claim 2, wherein the thermal diffusion section is composed of a metallic material.

5. The light source device according to claim 3, further comprising:
   a support section provided with the thermal diffusion section and the insulating layer, and that supports the wavelength conversion element; and
   a substrate on which the support section is disposed,
   wherein the support section is disposed on the substrate, the support section being disposed on a part of the support section that includes the insulating layer.

6. The light source device according to claim 2, further comprising:
   a support section provided with the thermal diffusion section, and that supports the wavelength conversion element; and
   a substrate on which the support section is disposed,
   wherein the support section is disposed on the substrate, the support section being disposed on a part of the support section that does not include the wavelength conversion element.

7. The light source device according to claim 2, further comprising:
   a support section provided with the thermal diffusion section, and that supports the wavelength conversion element,
   wherein the connection section is disposed on a centerline passing through a substantial center location of the support section.

8. The light source device according to claim 2, wherein the thermal diffusion section includes a heat insulating section that reduces heat conduction between the connection section and a part of the thermal diffusion section surrounding the connection section.

9. The light source device according to claim 1, wherein the thermal diffusion section includes a thinner section having a smaller distance between the first surface and the second surface, and
   the temperature measuring section is provided to the thinner section.

10. The light source device according to claim 9, wherein the thermal diffusion section is composed of an insulating material.

11. The light source device according to claim 9, further comprising:
    a support section provided with the thermal diffusion section, and that supports the wavelength conversion element;
    a substrate on which the support section is disposed; and
    a heat insulating section that reduces heat conduction between the support section and the substrate.

12. The light source device according to claim 9, further comprising:
    a support section provided with the thermal diffusion section, and that supports the wavelength conversion element; and
    a substrate on which the support section is disposed,
    wherein the support section is disposed on the substrate, the support section being disposed on a part of the support section that does not include the wavelength conversion element.

13. The light source device according to claim 9, further comprising:
    a support section provided with the thermal diffusion section, and that supports the wavelength conversion element,
    wherein the thinner section is disposed on a centerline passing through a substantial center location of the support section.

14. A lighting device comprising:
the light source device according to claim 1,
wherein the lighting device lights an object using a light beam from the source device.

15. A monitor device comprising:
the lighting device according to claim 14; and
an imaging section that images a subject lighted by the lighting device.

16. A projector comprising:
the lighting device according to claim 14; and
a spatial light modulation device that modulates a light beam from the lighting device in accordance with an image signal.

* * * * *